(12) United States Patent
Lubbers et al.

(10) Patent No.: US 7,797,487 B2
(45) Date of Patent: Sep. 14, 2010

(54) COMMAND QUEUE LOADING

(75) Inventors: Clark Edward Lubbers, Colorado Springs, CO (US); Robert Michael Lester, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 540 days.

(21) Appl. No.: 11/768,849

(22) Filed: Jun. 26, 2007

(65) Prior Publication Data

US 2009/0006606 A1  Jan. 1, 2009

(51) Int. Cl.
*G06F 12/00* (2006.01)
(52) U.S. Cl. ...................... 711/113; 709/224
(58) Field of Classification Search ............... 711/113, 711/E12.023, E12.026; 709/224
See application file for complete search history.

(56) References Cited

U.S. PATENT DOCUMENTS

| 6,170,042 B1* | 1/2001 | Gaertner et al. .......... 711/158 |
| 6,446,241 B1* | 9/2002 | Mobley et al. ............ 716/4 |
| 6,925,539 B2* | 8/2005 | Mowery et al. .......... 711/158 |
| 2003/0149838 A1* | 8/2003 | Mowery et al. .......... 711/113 |
| 2005/0149940 A1* | 7/2005 | Calinescu et al. ........ 718/104 |
| 2007/0043854 A1* | 2/2007 | Shum et al. .............. 709/224 |

* cited by examiner

*Primary Examiner*—Mardochee Chery
(74) *Attorney, Agent, or Firm*—McCarthy Law Group

(57) ABSTRACT

A data storage system and associated method are provided wherein a policy engine continuously collects qualitative information about a network load to the data storage system in order to dynamically characterize the load and continuously correlates the load characterization to a command queue depth of data transfer requests.

20 Claims, 7 Drawing Sheets

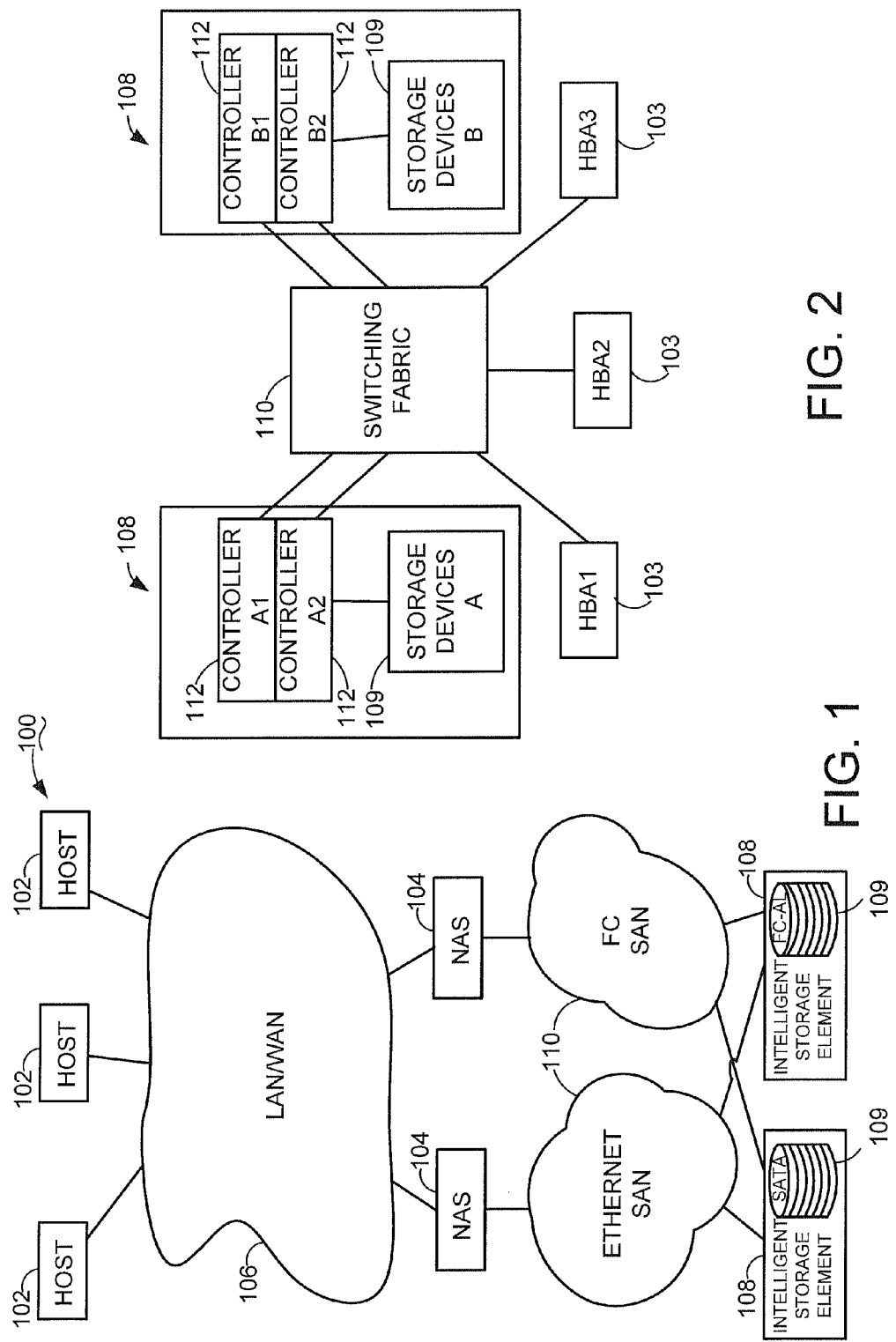

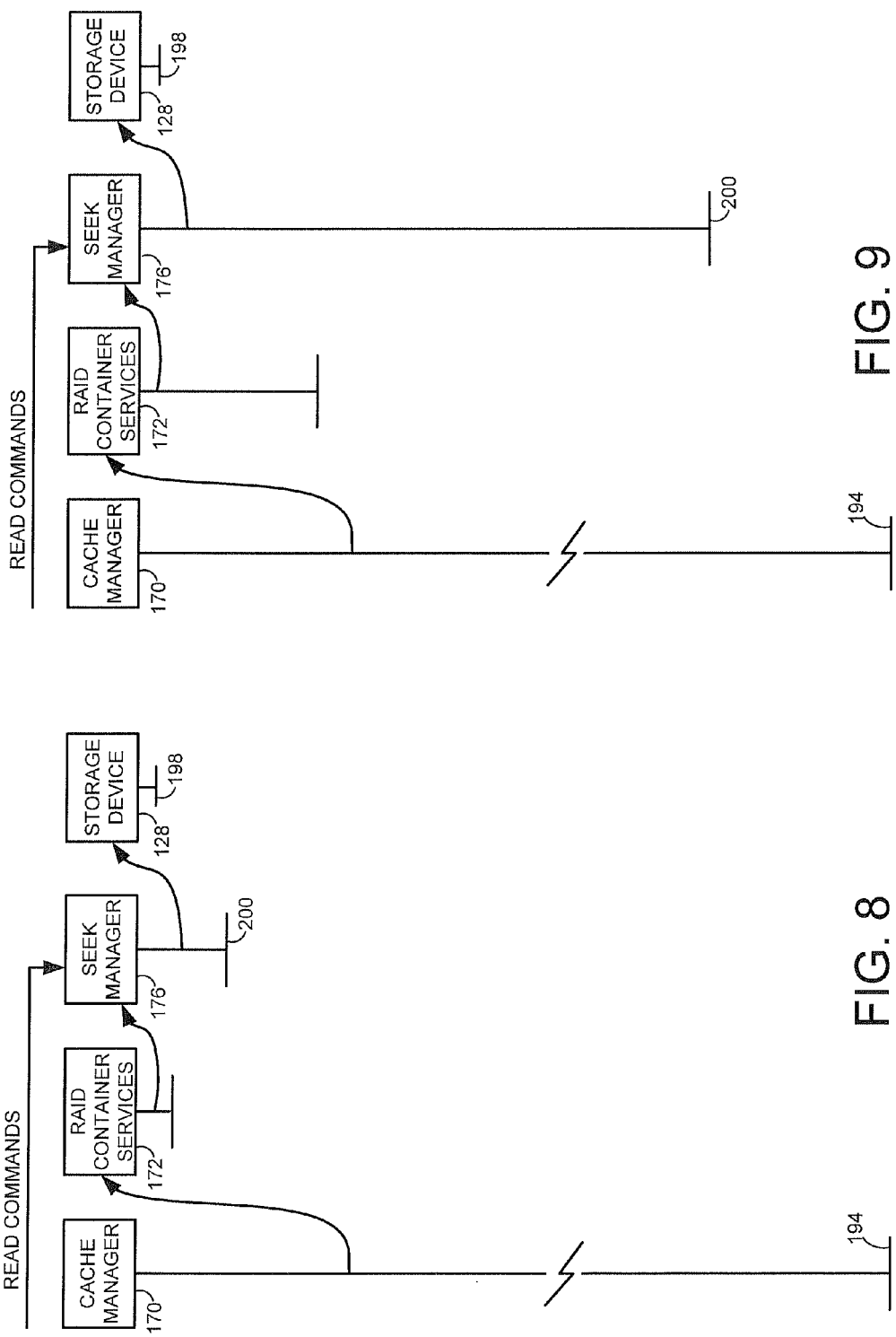

COMMAND QUEUE LOADING

FIELD OF THE INVENTION

Embodiments of the present invention relate generally to the field of storage systems and more particularly, but not by way of limitation, to an apparatus and method for adaptively managing seek command profiles in a distributed array storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY OF THE INVENTION

Embodiments of the present invention are generally directed to optimizing the flushing performance of dirty data by selectively loading the seek command queue under burst load conditions.

In some embodiments a data storage system and associated method are provided wherein a policy engine continuously collects qualitative information about a network load to the data storage system in order to dynamically characterize the load and continuously correlates the load characterization to a command queue depth of transfer requests for writeback commands and host read commands.

These and various other features and advantages which characterize the claimed invention will become apparent upon reading the following detailed description and upon reviewing the associated drawings.

BRIEF DESCRIPTION OF THE DRAWINGS

FIG. 1 is a diagrammatic representation of a computer system incorporating embodiments of the present invention.

FIG. 2 is a simplified diagrammatic representation of a portion of the computer system of FIG. 1.

FIG. 8 diagrammatically depicts the size of the command queue in an expected steady state network load condition.

FIG. 9 is similar to FIG. 8 but depicts the loaded command queue presented to the seek manager in an I/O burst condition.

DETAILED DESCRIPTION

Figure 3:
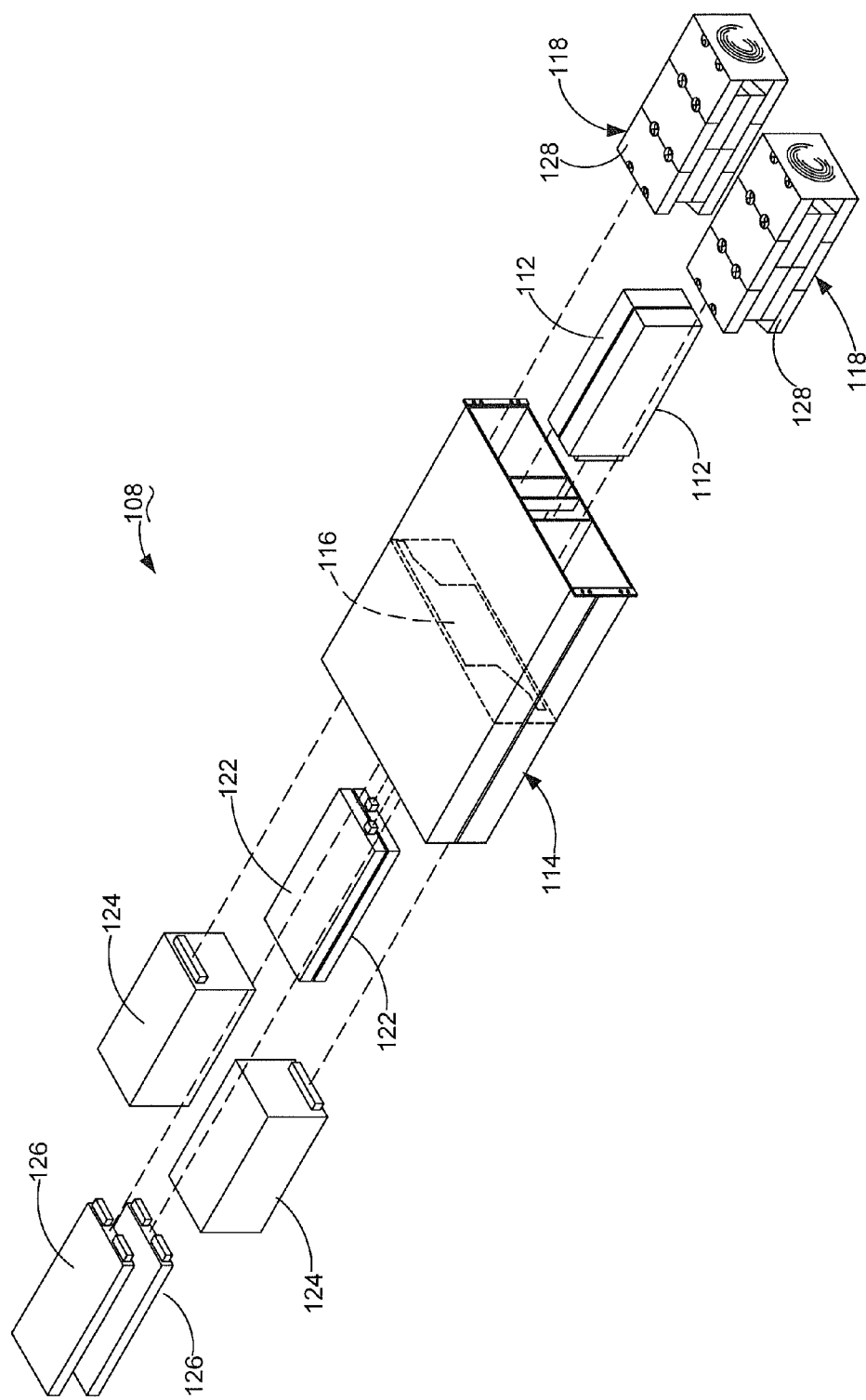
FIG. 3 is an exploded isometric view of an intelligent storage element constructed in accordance with embodiments of the present invention.

FIG. 1 is an illustrative computer system 100 incorporating embodiments of the present invention. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

FIG. 2 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

FIG. 3 illustrates an ISE 108 constructed in accordance with illustrative embodiments of the present invention. A shelf 114 defines cavities for receivingly engaging the controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
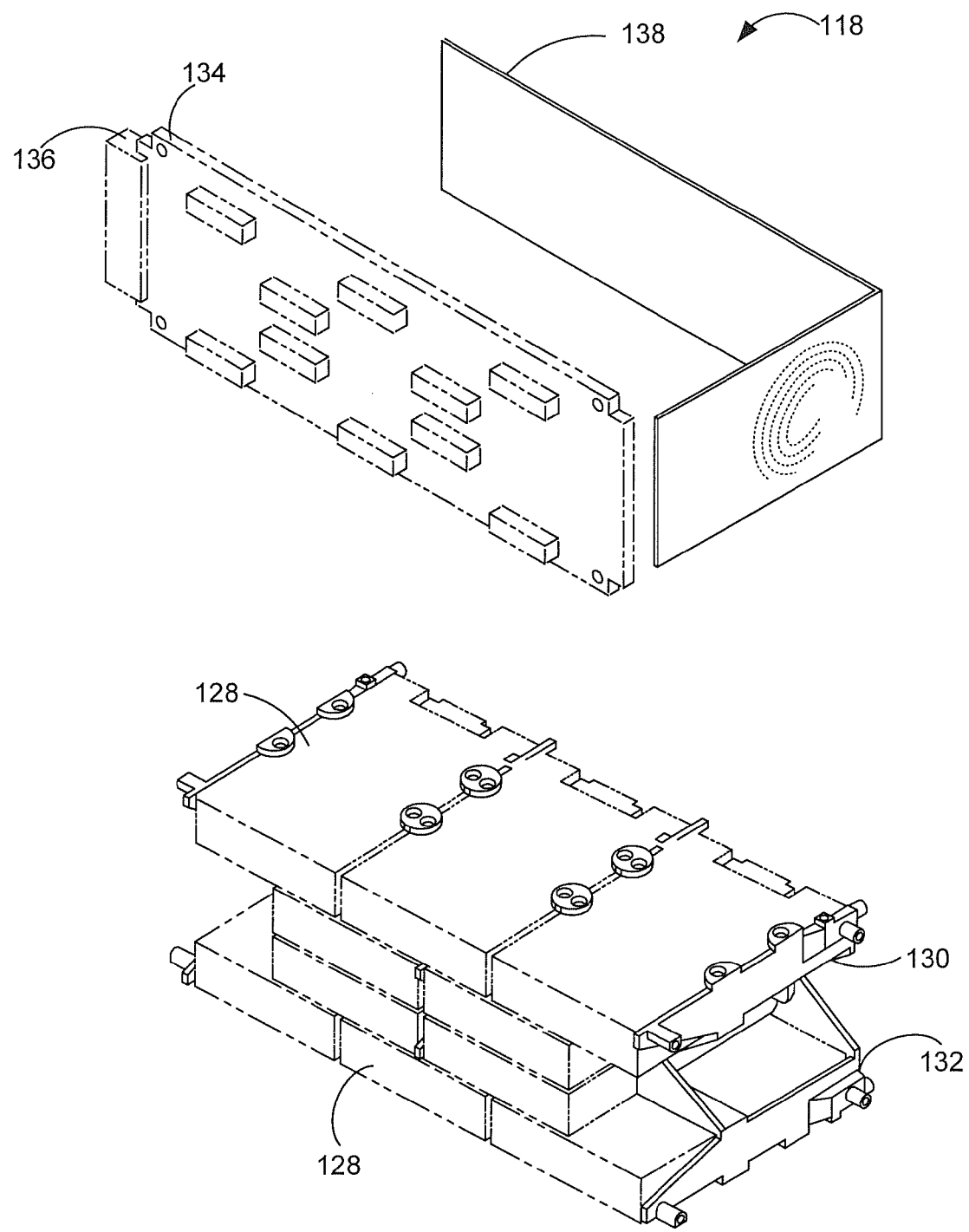
FIG. 4 is an exploded isometric view of a multiple drive array of the intelligent storage element of FIG. 3.

FIG. 4 is an enlarged exploded isometric view of the MDA 118 which has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of U.S. Pat. No. 7,133,291 entitled Carrier Device and Method for a Multiple Disc Array which is assigned to the assignee of the present invention and incorporated herein by reference. Another illustrative embodiment of the MDA 118 is the subject matter of U.S. Pat. No. 7,177, 145 of the same title which is also assigned to the assignee of the present invention and incorporated herein by reference. In alternative equivalent embodiments the MDA 118 can be provided within a sealed enclosure.

Figure 5:
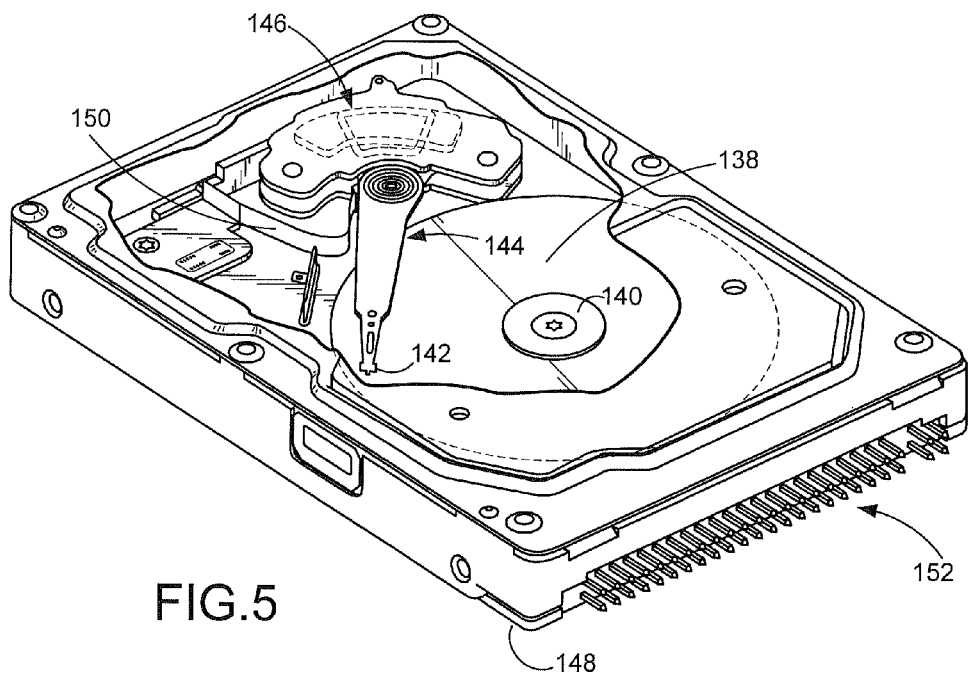
FIG. 5 is an exemplary data storage device used in the multiple drive array of FIG. 4.

FIG. 5 is an isometric view of the data storage device 128 suited for use with embodiments of the present invention and in the form of a rotating media disc drive. Although a rotating spindle with moving data storage medium is used for discussion purposes below, in alternative equivalent embodiments a non-rotating medium device, such as a solid state memory device is used. In the illustrative embodiments of FIG. 5 a data storage disc 138 is rotated by a motor 140 to present data storage locations of the disc 138 to a read/write head ("head") 142. The head 142 is supported at the distal end of a rotary actuator 144 that is responsive to a voice coil motor (VCM) 146 in moving the head 142 radially between inner and outer tracks of the disc 138. The head 142 is electrically connected to a circuit board 148 by way of a flex circuit 150. The circuit board 148 is adapted to receive and send control signals controlling the functions of the data storage device 128. A connector 152 is electrically connected to the circuit board 148, and is adapted for connecting the data storage device 128 with the circuit board 134 (FIG. 4) of the MDA 118.

Figure 6:
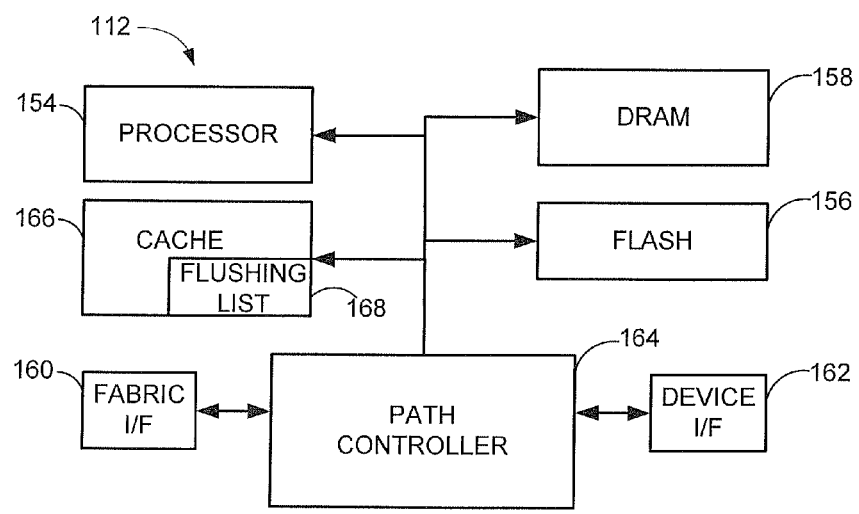
FIG. 6 is a functional block diagram of an array controller in the intelligent storage element of FIG. 3.

FIG. 6 diagrammatically depicts one of the controllers 112. The controller 112 can be embodied in a single integrated circuit, or distributed among a number of discrete circuits as desired. A processor 154, preferably characterized as a programmable computer processor, provides control in accordance with programming steps and processing data preferably stored in non-volatile memory 156 (such as flash memory or similar) and in dynamic random access memory (DRAM) 158.

A fabric interface (I/F) circuit 160 communicates with the other controllers 112 and the HBAs 103 via the fabric 110, and a device I/F circuit 162 communicates with the storage devices 128. The I/F circuits 160, 162 and a path controller 164 form a communication path to pass commands and data between network devices and the ISE 108 via the HBAs 103, such as by employing the cache 166. Although illustrated discretely, it will be understood that the path controller 164 and the I/F circuits 160, 162 can be unitarily constructed.

Preferably, in order to increase host processing performance, write commands to virtual blocks are writeback cached in the cache 166 and held as pending therein until a cache manager activates flushing activities for particular subsets of write commands by requesting RAID container services (RCS) to flush virtual blocks to the storage devices 128. RCS executes algorithms that pass requests to perform specific data transfers to seek managers in order to effect the update of media in accordance with RAID algorithms that reliably update media. A seek manager manages a command queue for a specific storage device 128 to, in effect, grant permissions to issue data transfer requests winch are derived from cached writeback commands and higher priority host read commands. The seek manager allocates resources for performing the associated data transfers that, in effect, grants permissions to issue the transfer requests.

The data storage capacity of an ISE 108 is organized into logical devices that are referenced when storing data to and retrieving data from the drives 128. System configuration information defines the relationship between user data as well as any associated parity and mirror data and the respective storage locations. The system configuration information furthermore identifies the relationship between blocks of storage capacity allocated to data and the associated memory storage locations, such as in terms of logical block addresses (LBA). The system configuration information can furthermore include virtualization by defining virtual block addresses that are mapped to logical block addresses.

The controller 112 architecture advantageously provides scalable, highly functional data management and control of the storage capacity. Preferably, stripe buffer lists (SBLs) and other metadata structures are aligned to stripe boundaries on the storage media and reference data buffers in cache 166 that are dedicated to storing the data associated with a disk stripe during a storage transaction.

During operation, the cache 166 will store user data and other information associated with I/O transfers through the HBAs 103 via the SAN 110. Readback data retrieved from the storage devices 128, including non-requested speculative data, may be retained for a time in the cache 166 in hopes of a subsequent "cache hit," so that the subsequently requested data are forwarded directly from the cache 166 instead of requiring the scheduling of an access command directed to the storage devices 128. Similarly, a writeback cache policy is employed so that data to be written to the storage devices 128 is cached, a completion acknowledgement is sent back to the initiating network device via the HBA 103, but the actual writing of the data to the storage device 128 is scheduled at a later convenient time.

It is thus generally necessary for the controller 112 to maintain accurate control of the contents of the cache 166, including tracking the status of each entry. Such control is preferably carried out by way of a skip list arrangement which utilizes an address related table structure. The skip list is preferably maintained in a portion of the cache 166, although other memory spaces can be utilized as desired.

The cache 166 is managed on a node basis by the controller 112 using a data structure referred to as a stripe data descriptor (SDD). Each SDD holds data concerning recent and current accesses to the data with which it is associated. Each SDD preferably aligns to a corresponding RAID stripe (i.e., all of the data on a selected storage device associated with a particular parity set), and conforms to a particular stripe buffer list (SBL).

Each cache node managed by the controller 112 preferably references some particular SDD, with active SDD structures for a given set of logical discs being preferably linked in ascending order via a virtual block address (VBA) using forward and backward linked lists.

Preferably, the VBA values are aligned with the RAID data organization using a grid system sometimes referred to as a RAID Allocation Grid System (RAGS). Generally, any particular collection of blocks belonging to the same RAID strip (e.g., all of the data contributing to a particular parity set) will be assigned to a particular reliable storage unit (RSU) on a particular sheet. A book consists of a number of sheets and is constructed from multiple contiguous sets of blocks from different storage devices. Based on the actual sheet and VBA, the books can be further sub-divided into zones, indicating the particular device or device set (when redundancy is employed).

Each SDD preferably includes variables that indicate various states of the data, including access history, locked status, last offset, last block, timestamp data (time of day, TOD), identifiers to which zone (book) the data belong, and RAID level employed. Preferably, writeback ("dirty") data) status of the data associated with the SDD is managed in relation to dirty data, dirty buffer, dirty LRU and flushing LRU values.

Preferably, the controller 112 concurrently operates to manage the writeback data processes at a number of different levels, depending on system requirements. A first level generally involves the periodic flushing of full SDD structures when a full RAID strip is detected. This can be readily carried out for a given SDD based on the RAID level variable when the SDD identifies the associated data as dirty. Preferably, this involves a backward inspection to determine if enough consecutive adjacent SDD structures are sufficiently full of dirty data. If so, these SDD structures are placed in the command queue and a request is made to commence flushing of the data.

Flushing smaller sets of data are also preferably handled on an SDD basis. Any SDD with dirty blocks and no locked blocks are preferably set as dirty LRU and sorted by age (e.g., time the data has spent in the cache waiting flushing). Once a particular aging is reached, the flushing LRU variable is preferably set and the command queue is updated.

When a particular range of consecutive dirty blocks is scheduled for flushing, the controller 112 will preferably locate other ranges of dirty blocks based on the RAID level that have proximate locality; that is, blocks that are "nearby" such as in terms of seeking time or that involve access to the same RAID parity strip.

In accordance with the present embodiments, the aggressiveness of the flushing of data from the command queue is tied to the host load of I/O commands. That is, not flushing aggressively enough during a relatively high host load can cause the cache 126 to reach saturation. Conversely, flushing too aggressively during a relatively low host load can negatively impact the latency of host read requests. Both scenarios adversely affect ISE 108 system performance.

Figure 7:
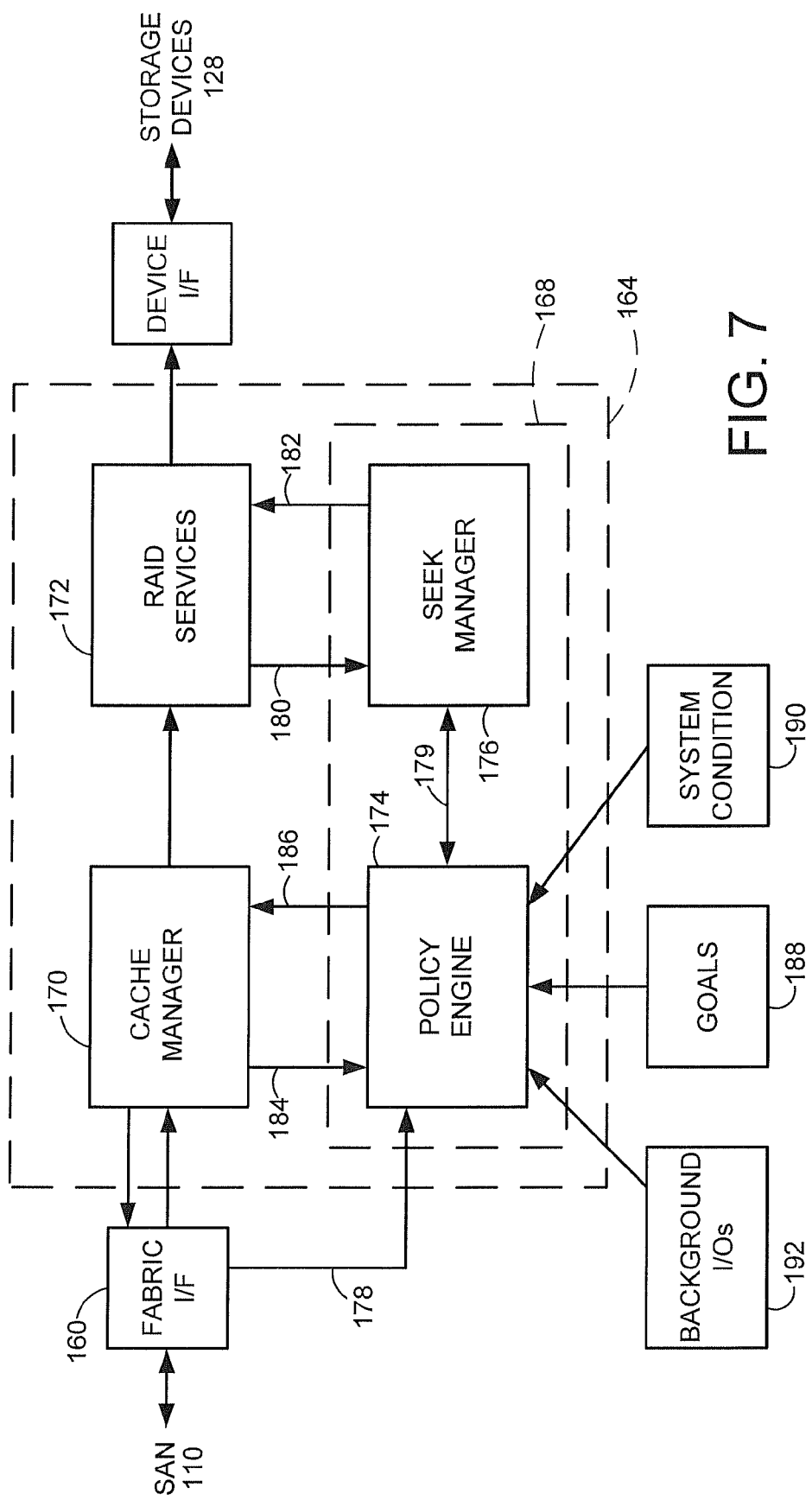
FIG. 7 is a functional block diagram of a portion of the array controller of FIG. 6.

FIG. 7 is a functional block diagram depicting a cache manager 170, a RAID container services 172, a policy engine 174, and a seek manager 176 that reside in the path controller 164 (FIG. 6). Although only one seek manager 176 is depicted, there is a dedicated seek manager 176 for each storage device 128 so that they are individually responsive to seek rules from the policy engine 174.

These functional blocks can implemented in software or hardware, in the latter such as but not limited to the policy engine 174 being a finite state machine. In any event, the policy engine 174 continuously collects qualitative data about access commands received via the fabric I/F 160 on an I/O by I/O basis via path 178. The policy engine 174 dynamically characterizes the network load and consequently issues seek rules via path 179 that govern the seek manager 176 which, in turn, queries a command queue of data transfer requests derived from requests to flush writeback data and host read commands via path 180 and selectively grants permissions to issue data transfer requests via path 182 to define a command profile.

The policy engine 174 can be responsive to performance goals 188 in formulating rules for the seek manager 176. The goals 188 can be quantitative or qualitative, such as but not limited to enforcing a desired command profile that is some factor of the network load in terms of the ratio of latency sensitive commands to rate sensitive commands (ratio of read to write commands for writeback caching), enforcing assigned priorities to different LUN classes, or enforcing a desired read command latency. The policy engine 174 can also collect qualitative data characterizing the host load in other terms such as but not limited to the file size associate with I/O commands.

In addition, the policy engine 174 can be responsive to system condition information 190 in formulating rules governing the seek manager 176. For example, without limitation, a power supply indicator may inform the policy manager 174 that the ISE 108 has switched to a battery backup power source. In this condition the policy manager 174 will implement contingencies to aggressively flush the cache 166 with respect to the projected limited power availability. The policy engine 174 can also be responsive to the state of pending background I/Os 192, or I/Os not directly involved with access command data transfers, in formulating the seek rules governing the seek manager 176 in adjusting the command profile to the storage devices 128.

The policy engine 174 thus can use any combination of the load characterization, the goals 188, the system condition 190, and the background I/Os to define seek rules governing the seek manager 176 for issuing a selected data transfer from a plurality of data transfers in the command queue of data transfers derived from cached writeback commands and higher priority host read commands.

In an illustrative example the policy engine characterizes the network load in terms of the ratio of rate sensitive commands to latency sensitive commands. For purposes of the present description a writeback caching scheme is presumed. Thus, writeback cache commands are considered to be rate sensitive commands because it does not matter so much which requests are flushed to the data storage devices 128 at any point in time. In fact, rate sensitive requests may even be overwritten while pending in cache 166 as dirty data. What matters is that rate sensitive commands get flushed at a rate that prevents the cache 166 from reaching saturation.

On the other hand, an access command to read data that is stored in one or more of the data storage devices 128 will likely cause the network application to block further processing until the access command is satisfied. The time it takes to satisfy the access command, the latency period, is critical to the performance of the application. Such commands are thereby referred to as the latency sensitive commands. In certain circumstances the host can opt to not authorize writeback caching. In that case a write command, called a write through cache command, is likewise categorized as a latency sensitive command.

In collecting qualitative data the policy engine 174 preferably tallies counts during each of a predetermined sample interval, such as but not limited to each one-second interval. For collecting data on the ratio of read commands to write commands, for example, a free running counter can be set with a pointer moving the index on one-second boundaries to continuously track the ratio. The counter holds a desired number of previously observed ratios, such as the previous 8 one-second sample ratios, with a ninth slot for tallying the current one-second ratio. On the one-second boundaries the index cycles, subtracts the indexed historical value and adds the latest sample value, then divides by 8 to calculate the most recent running average of the ratio.

Staying the with illustrative example, when the policy engine 174 observes that a load burst is occurring it can issue rules governing the seek manager 176 to modify the command profile in relation to the network load in an effort to prevent a saturation condition in the cache 166. The rules may cause the command profile to match the network load in terms of the ratio of write commands to read commands. The rules may also modify or even temporarily suspend other goals such as the maximum latency and the LUN class priority in order to recover from saturation as quickly and smoothly as possible.

In conditions like this when emphasis is put to the seek manager 176 to aggressively flush cached commands, it has been determined that flushing performance can be significantly improved by increasing the depth of the command queue of transfer requests. In other words, the present embodiments contemplate the policy engine 174 also using the load characterization to define rules governing the cache manager 170 that "load up" the command queue presented to the seek manager 176.

FIGS. 8 and 9 diagrammatically depict pertinent portions of the array controller 112 during steady state load conditions and during I/O burst conditions, respectively, in accordance with embodiments of the present invention. The list of write-back cached data in the cache 166, denoted as 194 and 196, is typically on the order of several thousand nodes in both conditions. The drive queue 198 in each storage device 128 is relatively small and also constant in both conditions. However, note that the cache manager 170 is responsive to rules from the policy engine 174 to define a first command queue depth 200 in the steady state condition, and defines a second command queue depth 202 that is significantly larger than the first command queue depth 200 in the burst condition. Typically, the command queue depth 200 is in the range of about 20 to 40 transfer requests. Preferably, when a burst condition is occurring in a saturated state the adjusted command queue depth 202 will be in the range of about 200 to 500 requests, or at least about an order of magnitude larger than at steady state conditions.

Figure 10:
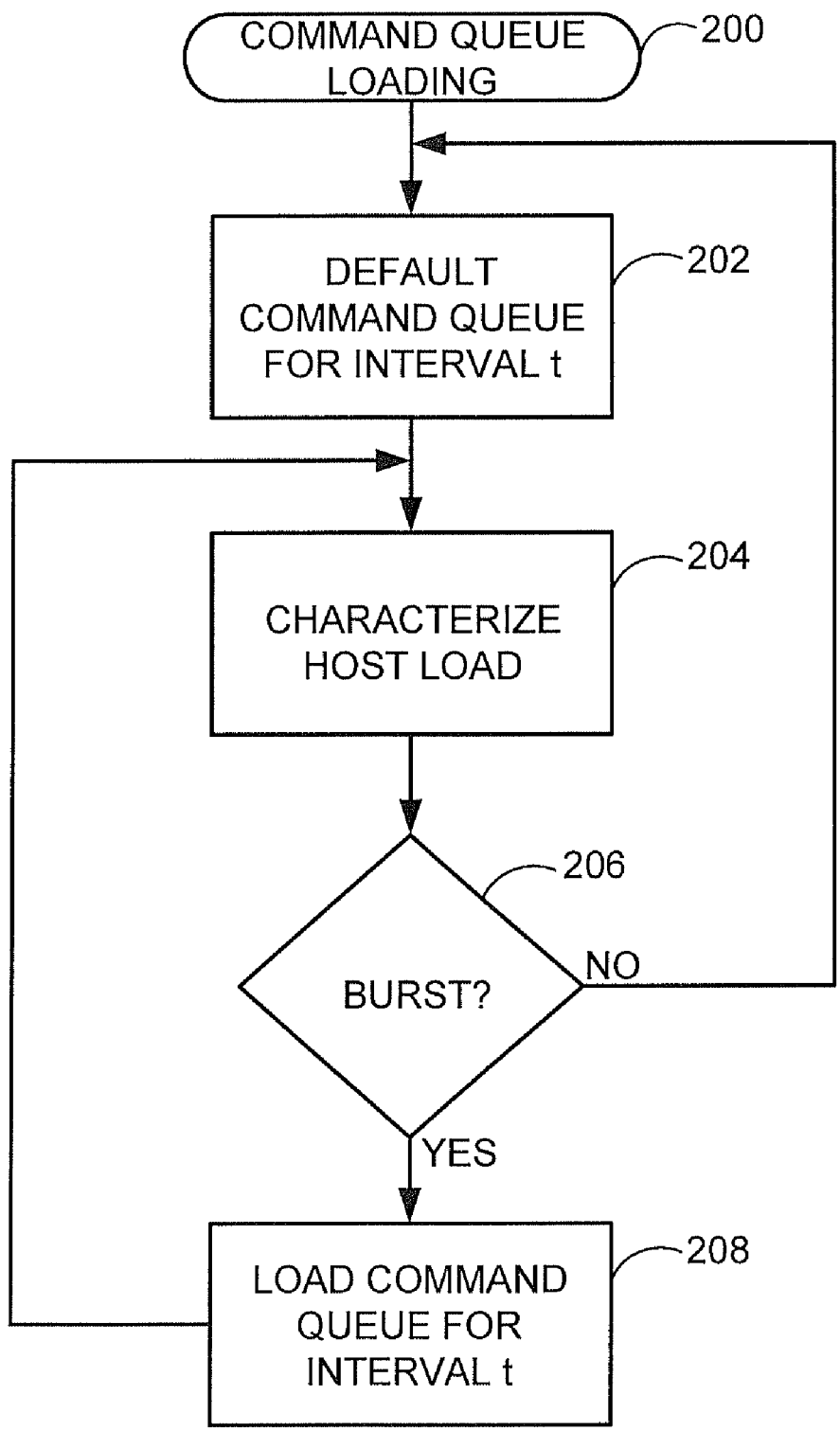
FIG. 10 is a flowchart depicting steps in a method for COMMAND QUEUE LOADING in accordance with embodiments of the present invention.

FIG. 10 is a flowchart depicting steps in a method 200 for COMMAND QUEUE LOADING in accordance with embodiments of the present invention. The method 200 begins in block 20 with the default mode command queue depth, such as on the order of 20 to 40 transfer requests. The default mode is implemented for a predefined interval, such as but not limited to for a one-second interval, during which the policy engine collects data regarding the network load. The latest data is used in block 204 to dynamically characterize the host load, such as in terms of the read to write ratio and I/O rate.

In block 206 the policy engine determines whether a burst of I/O commands is evident from monitoring the network load. If the determination of block 206 is no, then control returns to block 202 so that default conditions persist. If, however, the determination of block 206 is yes, then in block 208 the policy engine uses the characterization of the host load, and perhaps the goals 188, system condition 190 and background I/Os 192, to invoke loading the command queue to a significantly larger depth, such as about an order of magnitude larger than the default depth. For example, without limitation, if a high write command to read command ratio is occurring in a saturated state then the policy engine can govern the seek manager to match the command profile to the host load in terms of the write to read ratio until recovery from saturation is achieved. In support of that effort the policy engine will also increase the depth of the command queue significantly in accordance with the present embodiments. The policy engine might even modify or even temporarily suspend other rules such as read latency and LUN class priority goals in order to recover from saturation as quickly and as smoothly as possible. The loaded command queue rules are invoked for the predetermined interval, such as a one-second interval, during which the next batch of load data is collected and then control returns to block 204.

Generally, the present embodiments contemplates a storage device array configured for connecting to a network to transfer data in response to network access commands, and means for loading a command queue by correlating the size of the command queue of data transfer requests to an observed characterization of a network load of access commands. For purposes of this description and meaning of the appended claims the phrase "means for loading" expressly includes the structure disclosed herein and equivalents thereof that permit the controller 112 to characterize the network load and directly adjust the command queue according to the characterization.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed:

1. A controller in a data storage system, the controller comprising a host adaptive seek technique environment (HASTE) module that includes policy engine logic operably continuously collecting qualitative information about a load from a network device to the controller, the qualitative information distinguishing commands in the load between rate sensitive commands and latency sensitive commands, in order to formulate a dynamic characterization of the load and continuously correlate the dynamic characterization to a corresponding selected command queue depth of data transfer requests.

2. The controller of claim 1 comprising a cache manager that is responsive to the policy engine logic to define a first command queue depth when the dynamic characterization indicates that the load is substantially at or below an expected steady state, and to define a second command queue depth that is larger than the first command queue depth when the dynamic characterization indicates a burst of command activity.

3. The controller of claim 2 wherein the second command queue depth is at least about an order of magnitude larger than the first command queue depth.

4. The controller of claim 3 wherein the selected command queue depth is presented to a seek manager that selectively issues data transfer commands from a command queue having the selected command queue depth to define a command profile.

5. The controller of claim 4 wherein the policy engine logic defines rules in relation to the dynamic characterization and in relation to predefined goals that govern the seek manager in defining the command profile.

6. The controller of claim 5 wherein the policy engine logic rules selectively correlate the command profile to the dynamic characterization in terms of a ratio of the rate sensitive commands to the latency sensitive commands.

7. The controller of claim 6 wherein the policy engine logic rules selective match the command profile to the dynamic characterization in terms of the ratio of the rate sensitive commands to the latency sensitive commands.

8. The controller of claim 5 wherein the policy engine logic rules selectively correlate the command profile to a desired maximum latency of commands.

9. The controller of claim 5 wherein the policy engine logic rules selectively correlate the command profile to priorities assigned to different LUN classes.

10. The controller of claim 3 wherein the dynamic characterization is in terms of a ratio of the rate sensitive commands to the latency sensitive commands.

11. The controller of claim 10 wherein the rate sensitive commands are writeback cache commands and the latency sensitive commands are at least one of read commands and writethrough cache commands.

12. The controller of claim 11 wherein the dynamic characterization is in terms of a bandwidth associated with each command.

13. The controller of claim 12 wherein the policy engine comprises a finite state machine.

14. A method comprising:
monitoring a command stream load from a network device to a storage system in order to collect qualitative data about commands in the command stream, the qualitative data distinguishing the commands between rate sensitive commands and latency sensitive commands, to formulate a dynamic characterization of the load;
using the dynamic characterization to define a selected command queue depth of data transfer requests.

15. The method of claim 14 wherein the using step comprises defining a first command queue depth when the dynamic characterization indicates that the load is substantially at or below an expected steady state, and defining a second command queue depth that is larger than the first command queue depth when the dynamic characterization indicates a burst of command activity.

16. The method of claim 15 wherein the using step comprises defining the second command queue depth to be about an order of magnitude larger than the first command queue depth.

17. The method of claim 16 wherein the monitoring step comprises characterizing the load in terms of a ratio of the rate sensitive commands to the latency sensitive commands.

18. The method of claim 17 wherein the monitoring step comprises characterizing writeback cache commands as being the rate sensitive commands and characterizing at least one of read commands and writethrough cache commands as being the latency sensitive commands.

19. The method of claim 18 wherein the monitoring step comprises characterizing the load in terms of a bandwidth associated with each command.

20. A storage system comprising:
a storage array configured for connecting to a network to transfer data in response to network commands; and
means for loading a command queue by individually correlating a size of the command queue for each data storage device in the array to an observed qualitative characterization that distinguishes rate sensitive commands from latency sensitive commands in a network load.

* * * * *